United States Patent
Huffman et al.

(10) Patent No.: US 12,074,872 B2
(45) Date of Patent: *Aug. 27, 2024

(54) UNIVERSAL DIGITAL IDENTITY AUTHENTICATION SERVICE

(71) Applicants: Equifax, Inc., Atlanta, GA (US); FIDELITY INFORMATION SERVICES, LLC, Jacksonville, FL (US)

(72) Inventors: Richard Huffman, Roswell, GA (US); Richard Michaelson, Shoreview, MN (US); Ravindra Bijlani, Alpharetta, GA (US); Shriram Salem, Cummings, GA (US); Rob Harris, Jacksonville, FL (US); Vivian Van Zyl, Atlanta, GA (US); Helcio Cano, Peachtree Corners, GA (US); Gaurav R. Khanna, Marietta, GA (US); Esther Pigg, Duluth, GA (US); Marty Romain, Oakdale, MN (US)

(73) Assignees: Fidelity Information Services, LLC, Jacksonville, FL (US); Equifax, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,536

(22) Filed: Apr. 10, 2023

(65) Prior Publication Data

US 2023/0254311 A1     Aug. 10, 2023

Related U.S. Application Data

(63) Continuation of application No. 17/371,932, filed on Jul. 9, 2021, now Pat. No. 11,652,820, which is a
(Continued)

(51) Int. Cl.
*H04L 9/40* (2022.01)
*G06F 21/62* (2013.01)
(Continued)

(52) U.S. Cl.
CPC ...... *H04L 63/0884* (2013.01); *G06F 21/6245* (2013.01); *G06F 21/6263* (2013.01);
(Continued)

(58) Field of Classification Search
CPC ..... H04W 12/06; H04W 12/67; H04W 12/30; H04L 63/0884; H04L 63/083; H04L 63/0861; H04L 63/102
See application file for complete search history.

(56) References Cited

U.S. PATENT DOCUMENTS

| 7,685,629 B1 | 3/2010 | White |
| 8,522,018 B2 * | 8/2013 | Molina ............... H04W 12/069 713/168 |

(Continued)

FOREIGN PATENT DOCUMENTS

| EP | 2654264 | 10/2013 |
| WO | WO 2002/095589 | 11/2002 |
| WO | WO 2018/151822 | 8/2018 |

OTHER PUBLICATIONS

V. Kotwal, S. Parsheera and A. Kak, "OPEN Data & digital identity: Lessons for Aadhaar," 2017 ITU Kaleidoscope: Challenges for a Data-Driven Society (ITU K), Nanjing, China, 2017, pp. 1-8. (Year: 2017).*

(Continued)

*Primary Examiner* — Kari L Schmidt
(74) *Attorney, Agent, or Firm* — Fish & Richardson P.C.

(57) ABSTRACT

The present disclosure involves systems and methods for identity authentication across multiple institutions using a trusted mobile device as a proxy for a user login. In one
(Continued)

example, the operations include identifying a request to trust a particular user associated with a first entity in a digital ID network. A set of personally identifiable information (PII) associated with the user is obtained via the first entity and an identity verification (IDV)/fraud risk analysis is performed. In response to satisfying the analysis, instructions are transmitted to the user to verify the identity via a mobile trust application on an associated mobile device. Upon verification, the mobile device is bound to the user within the digital ID network along with a digital ID associated with the particular user. The digital ID can be used by other entities registered within the digital ID network to authenticate the user.

21 Claims, 4 Drawing Sheets

Related U.S. Application Data continuation of application No. 16/322,705, filed as application No. PCT/US2018/000034 on Feb. 16, 2018, now Pat. No. 11,095,643.

(60) Provisional application No. 62/460,611, filed on Feb. 17, 2017.

(51) Int. Cl.
| | |
|---|---|
| *H04W 12/06* | (2021.01) |
| *H04W 12/12* | (2021.01) |
| *H04W 12/30* | (2021.01) |
| *H04W 12/67* | (2021.01) |
| *G06K 7/10* | (2006.01) |
| *G06K 7/14* | (2006.01) |
| *G06Q 20/32* | (2012.01) |
| *G06Q 20/40* | (2012.01) |
| *G06Q 30/018* | (2023.01) |
| *H04L 67/53* | (2022.01) |
| *H04W 12/63* | (2021.01) |

(52) U.S. Cl.
CPC ........ *H04L 63/083* (2013.01); *H04L 63/0861* (2013.01); *H04L 63/102* (2013.01); *H04W 12/06* (2013.01); *H04W 12/12* (2013.01); *H04W 12/30* (2021.01); *H04W 12/67* (2021.01); *G06K 7/10722* (2013.01); *G06K 7/1417* (2013.01); *G06Q 20/326* (2020.05); *G06Q 20/40145* (2013.01); *G06Q 20/405* (2013.01); *G06Q 30/0185* (2013.01); *H04L 67/53* (2022.05); *H04W 12/63* (2021.01)

(56) References Cited

U.S. PATENT DOCUMENTS

| | | | |
|---|---|---|---|
| 8,918,904 B2 | 12/2014 | Sanin et al. | |
| 8,984,276 B2* | 3/2015 | Benson | H04L 9/3226 713/155 |
| 9,202,026 B1 | 12/2015 | Reeves | |
| 9,721,147 B1 | 8/2017 | Kapczynski | |
| 9,767,309 B1 | 9/2017 | Patel | |
| 10,115,079 B1 | 10/2018 | Burger | |
| 10,454,926 B2 | 10/2019 | Bruno et al. | |
| 10,657,521 B2 | 5/2020 | Tomasofsky et al. | |
| 10,922,631 B1 | 2/2021 | Shahidzadeh | |
| 11,055,390 B1* | 7/2021 | Kragh | H04L 9/3297 |
| 11,252,573 B1 | 2/2022 | Shahidzadeh | |
| 11,528,139 B2* | 12/2022 | Smets | G06Q 20/3827 |
| 2006/0047725 A1* | 3/2006 | Bramson | H04L 67/306 |
| 2006/0282660 A1* | 12/2006 | Varghese | G07F 7/1083 713/155 |
| 2006/0282662 A1 | 12/2006 | Whitcomb | |
| 2007/0106892 A1 | 5/2007 | Engberg | |
| 2007/0265984 A1 | 11/2007 | Santhana | |
| 2010/0125635 A1 | 5/2010 | Axelrod | |
| 2011/0086616 A1 | 4/2011 | Brand | |
| 2012/0036569 A1 | 2/2012 | Cottrell et al. | |
| 2012/0297446 A1 | 11/2012 | Webb et al. | |
| 2013/0055346 A1 | 2/2013 | Singh | |
| 2013/0317993 A1 | 11/2013 | Wasserman | |
| 2014/0214670 A1* | 7/2014 | McKenna | G06Q 20/4014 705/44 |
| 2014/0258125 A1 | 9/2014 | Gerber et al. | |
| 2014/0282961 A1 | 9/2014 | Dorfman | |
| 2015/0101062 A1 | 4/2015 | Silver et al. | |
| 2016/0036800 A1* | 2/2016 | Carpenter | G06Q 20/306 726/6 |
| 2016/0360403 A1 | 12/2016 | Jordi | |
| 2016/0380774 A1 | 12/2016 | Lovelock | |
| 2017/0076274 A1 | 3/2017 | Royyuru et al. | |
| 2017/0208464 A1 | 7/2017 | Guertler | |
| 2017/0213211 A1 | 7/2017 | Sibert | |
| 2017/0237717 A1 | 8/2017 | Starosielsky | |
| 2017/0286765 A1 | 10/2017 | Rodriguez | |
| 2017/0300911 A1 | 10/2017 | Alnajem | |
| 2017/0359313 A1 | 12/2017 | Livneh | |
| 2018/0144325 A1* | 5/2018 | Finch | G06Q 20/3825 |
| 2018/0173906 A1* | 6/2018 | Rodriguez | H04L 63/102 |
| 2018/0181964 A1* | 6/2018 | Zagarese | G06Q 20/40145 |
| 2018/0255054 A1 | 9/2018 | Oberheide | |
| 2019/0089702 A1 | 3/2019 | Bhatt | |
| 2019/0166118 A1 | 5/2019 | Lee | |
| 2019/0266314 A1* | 8/2019 | Trelin | G06V 40/172 |
| 2019/0342096 A1 | 11/2019 | Starosielsky | |
| 2019/0349371 A1 | 11/2019 | Smith | |
| 2019/0349372 A1 | 11/2019 | Smith et al. | |
| 2020/0118090 A1* | 4/2020 | Bartrim | G06Q 20/204 |
| 2020/0372600 A1 | 11/2020 | Bloy | |
| 2020/0374129 A1 | 11/2020 | Dilles | |
| 2021/0042755 A1* | 2/2021 | Nolte | G06Q 20/3825 |
| 2021/0233066 A1* | 7/2021 | Mullaney | G06Q 20/405 |
| 2021/0336955 A1 | 10/2021 | Huffman et al. | |
| 2022/0109673 A1* | 4/2022 | Robinson-Morgan | H04W 12/069 |
| 2022/0394468 A1* | 12/2022 | Avetisov | H04L 63/083 |
| 2023/0032659 A1* | 2/2023 | Roy | H04W 12/30 |
| 2023/0086806 A1* | 3/2023 | Kamal | H04L 9/3247 726/7 |

OTHER PUBLICATIONS

J. M. McCune, A. Perrig and M. K. Reiter, "Seeing-is-believing: using camera phones for human-verifiable authentication," 2005 IEEE Symposium on Security and Privacy (S&P'05), Oakland, CA, USA, 2005, pp. 110-124 (Year: 2005).*

A. Nieto, R. Roman and J. Lopez, "Digital Witness: Safeguarding Digital Evidence by Using Secure Architectures in Personal Devices," in IEEE Network, vol. 30, No. 6, pp. 34-41, Nov.-Dec. 2016. (Year: 2016).*

Extended European Search Report in corresponding Application No. 18753578.6 dated Jan. 8, 2020, pp. 1-8.

International Search Report issued in corresponding International Application No. PCT/US2018/000034 on Jun. 8, 2018, 3 pages.

Maler et al., "The Venn of Identity: Options and Issues in Federated Identity Management," IEEE Security & Privacy, 2008, vol. 6, No. 2, pp. 16-23.

Mizuno et al., "Authentication using multiple communication channels," Proceedings of the 2005 workshop on Digital identity management, 2005, pp. 54-62.

Written Opinion of the International Searching Authority issued in corresponding International Application No. PCT/US2018/000034 on Jun. 8, 2018, 5 pages.

* cited by examiner

UNIVERSAL DIGITAL IDENTITY AUTHENTICATION SERVICE

CLAIM OF PRIORITY

This application claims priority under 35 U.S.C. § 120 to U.S. patent application Ser. No. 17/371,932, filed on Jul. 9, 2021, which claims priority under 35 U.S.C. § 120 to U.S. patent application Ser. No. 16/322,705, filed on Feb. 1, 2019, which claims priority to PCT Application No. PCT/US2018/000034, filed on Feb. 16, 2018, which claims priority under 35 USC § 119(e) to U.S. Patent Application Ser. No. 62/460,611, filed on Feb. 17, 2017, the entire contents of which are hereby incorporated by reference.

TECHNICAL FIELD

The present disclosure relates to computer systems and computer-implemented methods for identity authentication for use across financial institutions based on device profiling and biometrics to allow a mobile device to be used as a proxy for user authentication with an elevated trust credential.

Consumers and businesses have adopted the use of online, digital interaction channels in performing financial, business, and transaction-related activities. As a result, accurately and securely authenticating individuals and protecting their private personally identifiable information (PII) is mission critical to all financial institutions and retailers. However, current digital authentication methods have significant weaknesses and pose security threats that place individuals, businesses, and government entities at risk.

In addition to risks of interception of such information, banks, financial institutions, and other entities have found friction during the authentication process of users via mobile and other computing devices to be a leading cause of transaction or process abandonment. Further, as no holistic view of particular consumer activity is available, fraud losses between different institutions can occur without sharing information or transactional context. Still further, increased risks and costs are associated with redundant and/or manual data capture, including captures associated with multiple registrations and logins for different websites, applications, and other online entry points.

For consumers, friction during the authentication process can be burdensome and frustrating. Users may experience fears of repeated sharing of personal information at multiple websites and with multiple applications. Further, fatigue arises from managing multiple passwords as the basis for authentication for different systems. Alternatively, the use of the same password across multiple systems increases the chance that a single interception can result in catastrophic accessing of account information by wrongdoers.

SUMMARY

The present disclosure involves systems, software, and computer-implemented methods for identity authentication across multiple financial institutions using a single trusted mobile device as a proxy for a user login, while allowing for an elevated trust level in authentication processes based on the trusted mobile device and an evaluation of existing institutional knowledge regarding the user and predictive analysis to verify authentications and identity needs for further additional checks and authorizations. In one example, the system operations include identifying a request to trust a particular user, the particular user associated with a first trust relationship with a first entity, the first entity associated with the digital ID network. A set of personally identifiable information (PII) associated with the particular user is obtained via the first entity and an identity verification (IDV) and fraud risk evaluation analysis of the particular user is performed based on the obtained set of PII. In response to satisfying the IDV and fraud risk evaluation analysis, instructions are transmitted to the particular user to verify the identity of the particular user via a mobile trust application installed on a mobile device associated with the particular user. In response to verifying the identity of the particular user via the mobile trust application installed at the mobile device, the mobile device is bound to the particular user within the digital ID network, wherein the mobile device is associated with a unique set of device information and the unique set of device information is incorporated into a generated digital ID associated with the particular user, wherein the generated digital ID is available to be used by a plurality of entities registered within the digital ID network for authentication of the particular user.

In some instances, the generated digital ID associated with the particular user comprises a unique key created to associate the particular user's PII, where the mobile device associated with the particular user, and activities associated with the user.

In some instances, in response to satisfying the IDV and fraud risk evaluation analysis, a unique code associated with the particular user is generated, and transmitting the instructions to the particular user to verify the identity of the particular user via the mobile trust application can include transmitting the generated unique code to an interface of the first entity with the instructions to the particular user, wherein the identity of the particular user is verified via the mobile trust application by verifying the unique code transmitted with the instructions to the particular. In those instances generating the unique code can include generating an image encoding the unique code associated with particular user, and transmitting the unique code to the interface of the first entity can include transmitting the generated image to the interface of the first entity, wherein the instructions to the particular user to verify the identity of the particular user via the mobile trust application includes instructions to capture the transmitted image via the mobile trust application. Verifying the identity of the particular user can include confirming that the image captured by the mobile trust application matches the generated image encoding the unique code associated with the particular user.

In some instances, the first trust relationship between the first entity and the particular user is based on a predefined registration and authentication of the particular user by the first entity.

In some instances, the fraud risk evaluation of the particular user includes at least one of a knowledge-based authentication, a cross-channel comparison, an out-of-band authentication, a known fraud exchange evaluation, an analysis of PII usage velocity, an analysis of transactional velocity for the particular user, a transaction data analysis, a biometric analysis, a comparison of the particular user's PII against a set of known PII associated with a known risk of fraud, and a device reputation analysis.

In some instances, each entity of the plurality of entities is associated with a set of entity-specific authentication rules, each set of entity-specific authentication rules identifying a set of transactions for a particular entity and identifying a level of authentication required by users associated with those transactions. In those instances, at least some of the transactions for a particular entity require at least one first additional authentication operation for users associated with those transactions, wherein the at least one first additional authentication operation comprises a first authentication request to be transmitted from the digital trust system to a particular mobile device previously bound with the digital ID associated with the particular transaction. The digital trust system is further configured to transmit the first authentication request to the mobile trust application installed on the particular mobile device, wherein the first authentication request is presented via the mobile trust application.

In some of those instances, the first additional authentication request can comprise a request for biometric input from the user associated with the digital ID via the mobile trust application. Alternatively or additionally, the first additional authentication request comprises a request for a response via user input to an authentication challenge.

In some instances, wherein a first authentication request is required, the operations may further include receiving a response to the transmitted first authentication request from the mobile trust application installed on the particular mobile device and validating the received response. In response to a valid response to the first authentication request, the transaction can be authorized, while authorization of the transaction can be denied in response to an invalid response to the first authentication request. In some instances, a fraud detection evaluation is performed on each requested transaction associated with the digital ID, wherein the fraud detection evaluation is performed for each transaction request from the user when associated with the digital ID.

In those instances, in response to a potential fraud detection based on the fraud detection evaluation, at least a second additional authentication request can be performed, wherein the at least a second additional authentication request comprises a second authentication request to be transmitted from the digital trust system to a particular mobile device previously bound with the digital ID associated with the particular transaction, where the digital trust system is configured to transmit the second authentication request to the mobile trust application installed on the particular mobile device, the second authentication request is presented via the mobile trust application. The at least one second additional authentication request associated with the potential fraud detection can be performed without a determination that the at least one first additional authentication request is required.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
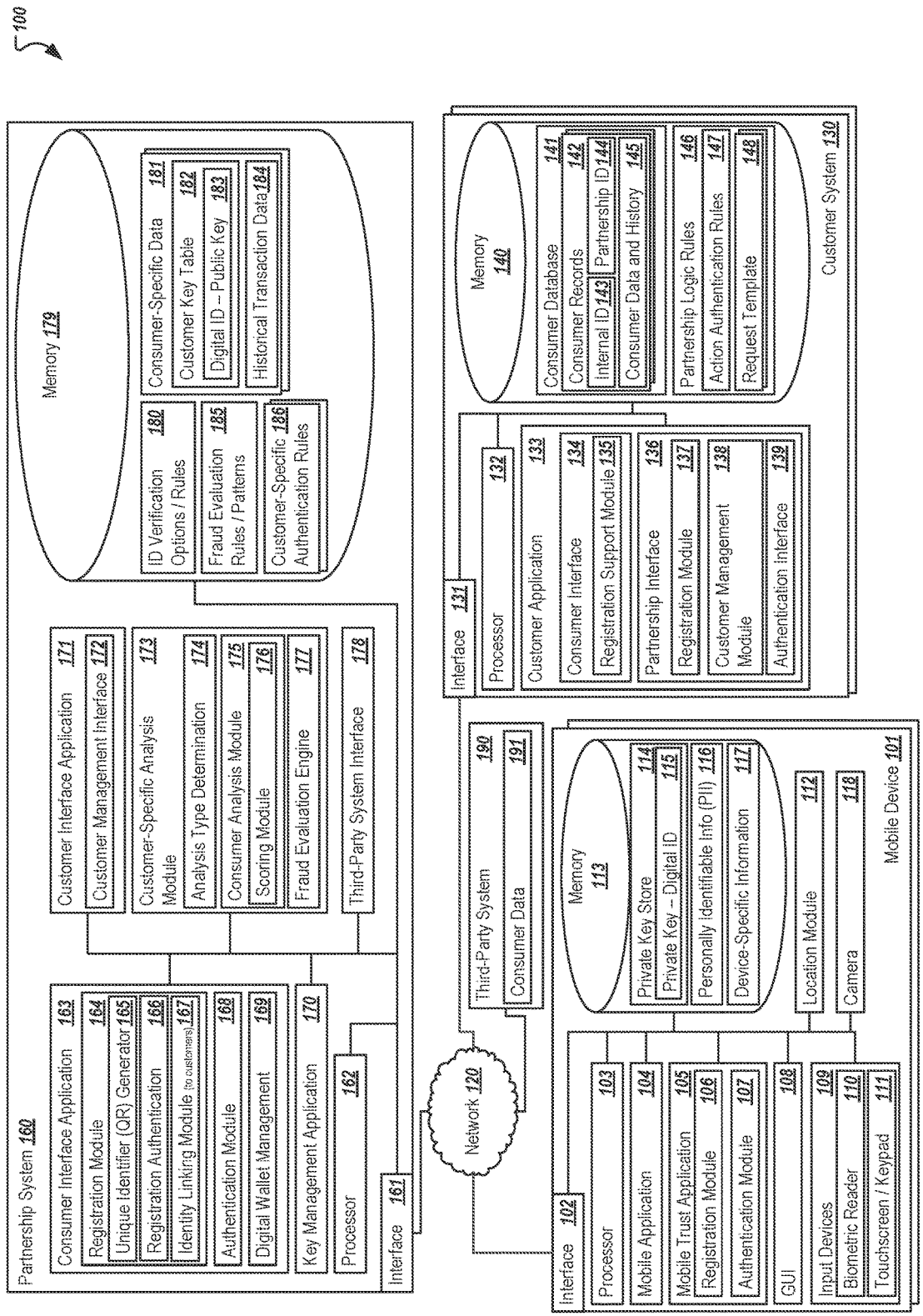
FIG. 1 is a block diagram illustrating an example system for implementing a digital ID network across a plurality of consumers and customers.

The present disclosure describes systems and methods for identity authentication across multiple authenticating entities, foe example, financial institutions using a single trusted mobile device as a proxy for a user login. Specifically, a combination of layered technology-based authentications and analytics are used to improve the user experience during digital transactions while also ensuring adequate levels of authentication are received for important or potentially fraudulent activities.

In the present description, multiple parties may be involved in the authentication process. For purposes of the description, the phrases "consumer," "customer," and "partnership" may be used, with each acting as a separate part of the process.

The "consumer" may be a user or client of a bank, financial institution, or other entity and whose mobile device may be digitally bound to personally identifiable information (PII) associated with the user.

The "customer" may be a bank or financial institution, as well as any other enterprise, business, or individual that uses a partnership system to manage and authenticate users/clients associated with activities occurring in association with the customer. For example, the "customer" may be a bank, a store with a digital storefront, a web-based shopping site, or any other suitable system requiring validation and authentication of users accessing the system.

The "partnership" represents a backend system capable of authenticating individual users and their mobile devices in order to authenticate particular users in a centralized and uniform manner, particularly based on the bound mobile devices.

The solutions described herein provide customers (e.g., banks and other authenticating entities) a more accurate level of fraud risk based on a universal and shared set of information about a particular user and their mobile device. Further, authentication techniques can be defined and applied based on the type of transaction being performed, thereby allowing customers the ability to require additional or more specific information from consumers in situations where the action being performed or requested by the consumer is determined to require additional authentication to enable a higher level of trust and/or assurance of identity, or where a higher possibility of potential fraud is present and further confidence is useful. The additional authentication factors can include, for instance, one-time pass codes, biometric input and verification, push notifications, and other suitable factors. Advanced analytics and network insights (e.g., information about the consumer from one or more additional or alternative sources) can be used as additional verification and fraud detection input or consideration information, providing an additional layer of analysis and inputs to the authentication operations of the system.

Similarly, consumers are associated with a one-stop application and a shared digital identity that can be used across multiple entities to interact securely with the consumer's credentials and PII, reducing the number and extent of information sharing needed to authenticate consumer, while also speeding up particular transactions that were previously slowed by manual login techniques. In many instances and scenarios, consumers may no longer need to share or supply their PII with individual entities after the initial registration, reducing the potential weak points in identify protection.

The present disclosure provides a universal, consumer digital ID that can be used as a secure, digital credential of the consumer's identity. Instead of being based only on something that the consumer knows (e.g., knowledge-based authentications and ID/password combinations), the digital ID represents a virtual connection between the consumer and his or her device. In one example, the digital ID represents a combination of multiple authentication techniques that can span three common authentication techniques: (1) what you know, (2) what you have, and (3) what you are. Once the digital ID is connected to the particular consumer, the digital ID can be passively verified and corroborated across participating business and government entities that also know and interact with the consumer bound to the digital ID. This combination of customers (e.g., those business and government entities) associated with the partnership system providing the digital ID can be referred to as a digital ID network, where the interconnectedness and corroboration of insight between the parties enables highly accurate and passive trust elevation.

In some events, such as those identified as low risk (e.g., by the customer), consumers may be able to login to particular participating systems using their mobile device alone without further interactions, unlike current systems. However, where an elevated risk situation is detected in association with a digital ID exchange, or where a high risk or high importance transaction requires further assurance and/or more security prior to authorization, the digital ID and the consumer binding to their mobile device can allow businesses or government entities to securely interact, via the digital channel, with the consumer through a dedicated mobile trust application. Using that dedicated mobile trust application, the customer and/or partnership system can ask for and receive additional information or data (e.g., a knowledge-based question, a biometric input, etc.) that can be used to perform additional authentication operations. The ability to conditionally invoke this interaction through a secure and protected channel based on the type of transaction or interaction being attempted or based on the particulars of the transaction or interaction itself, including based on customized or specific rules set by customers associated with the system, compliments the robust behind-the-scenes risk assessment based on the shared and comprehensive insight provided by information across the various participating entities.

In addition to providing customers with significant benefits, the digital ID and supporting procedures can allow consumers to manage, monitor, and control their digital ID usage and allow that digital ID to be universally accepted and used by participating entities with whom they choose to share it.

The advantages of the described process and system are numerous. Existing online authentication is improved by streamlining the online user experience via digitally-bound mobile devices that are used to assist in verification and authentication of the consumer to any participating system associated with the digital ID network. Further, based on the type of transaction being performed, the specifics of the particular transaction being performed, and/or other potential fraud predictors, enhanced levels of security and additional authentications can be triggered and provided via a secure digital channel to a single location (i.e., the mobile trust application), where the consumer can securely provide additional information to reach the heightened security requirement. The digital ID allows the subject identity (i.e., the consumer) to actively and passively be a part of the authentication process, such that the security framework feedback loop allows for quicker and more accurate detection of suspicious activity and fraud. Still further, the digital ecosystem allows participating entities to trust the digital ID provided as a true proxy for the consumer (and their identity) with whom the entities are interacting, providing an enhanced level of trust in each transaction performed in connection with the digital ID.

Although device binding and push notification authentication capability exists, the primary usage of such techniques is used by individual customers in isolation. The present solution uses the consortium network of participating customers and collected information at the partnership system, as well as additional available third-party data, where available, to create a highly informed and federated identity network that is enhanced by shared information and understanding between entities. The network allows the use of signals, insights, and feedback mechanisms from prior and current actions and transactions, as well as an analysis of similar consumers, to more accurately detect fraud and/or conditions which require increased authentication interactions.

In order to take advantage of the federated digital ID network, consumers may be directed to register with the network by one or more customer sites or apps when a consumer is not previously registered. Specifically, customer sites or apps can offer links to a registration interface to the backend partnership system, allowing the consumer to enroll and be associated with a trusted digital ID. The enrollment/registration process can be used in association with the user's mobile device (e.g., a phone, tablet, etc.) to complete the registration process.

First, the consumer can select the option to enroll with the partnership system. To do so, a separate mobile trust application (e.g., different from the consumer's browser and a mobile app or websites of the customer) provided by or associated with the partnership system can be made available to the user, such that the user can download and install the mobile trust application. The consumer can enter a set of personally identifiable information (PII) in an enrollment area of the customer website or application, where that information is then passed back to the partnership system and associated with the consumer.

In response to receiving the consumer's PII, the partnership system can perform a secure set of ID verifications ("IDV") upon the user's PII, including accessing and taking advantage of various industry standard confirmations and evaluations of the PII. At or around the same time or in connection with the verification, a set of fraud risk evaluations can be performed for the consumer, where the fraud risk evaluation operations can identify and store information within the partnership system about the relative risk and/or fraud associated with the consumer. In some instances, consumers determined to be associated with factors indicating potential and/or significant fraud risks, including but not limited to consumers using tethered mobile devices that are not located near the current device used to access the website/banking application, multiple consumers associated with the same governmental ID or using a common device, a single consumer identity being used at multiple bank sites simultaneously, or those who cannot have their identity verified through normal means, may not be allowed to create a digital ID as described herein. The fraud risk evaluations that may cause the consumer not to be verified may include an unusual volume of interactions across the network for a particular PII or mobile device, an unusual combination of prior interactions (e.g., a change of address combined with a re-registration of a new device), a high volume of rejected transactions, prior data associated with the provided PII identified as a relatively high risk, a low volume or knowledge set of the PII information, a device signature mismatch (e.g., primary and secondary channel signature mismatches), and mismatching sets of provided PII information as compared to a carrier's PII information, as well as any other suitable evaluation and/or determination.

Once the consumer passes the initial IDV and risk criteria checks, the partnership system can generate a unique code and push the unique code and/or a representation of the unique code (e.g., a QR (or "Quick Response") code) to the web site or mobile application (where appropriate) of the customer, where that underlying unique code is specifically associated with the consumer performing the registration process. The representation of the unique code can uniquely encode information used to verify the consumer and the consumer's mobile device. The purpose of the representation of the unique code, such as a QR code, is to bridge trust between channels in an out-of-band manner. The trust of the primary channel (e.g., an online banking session in which the user of the device has already logged in) is inferred or transferred to the mobile device of the consumer via the unique code. In some instances, the unique code can be provided without encoding (e.g., as a string of characters). To complete the binding of the mobile device to the consumer, the consumer can be asked to take a photo of the unique code representation (e.g., the QR code) or the exact unique code (e.g., where the unique code is provided directly without encoding) via the downloaded mobile trust application. The photo can be taken as a screenshot (if captured on or by the mobile device), a photo taken of a desktop system by the mobile device (and stored in the device's photo library), or any other suitable method. The photo of the unique code can then be submitted by the mobile trust application to the partnership system and verified/authenticated. Other methods of inputting the unique code other than through use of the device's camera may be used in the alternative. Once the photo or input of or associated with the unique code is captured, the mobile trust application is used to bind the consumer's PII and other information with a set of mobile device-specific information to create the consumer's digital ID for use in future systems.

In general, the digital ID may take the form of an alpha-numeric code (or another suitable identifier) that represents a particular consumer record or consumer profile which combines a particular consumer's PII (e.g., name, address, date of birth, and/or social security number (SSN), etc.) with a phone number, email address, biometric template of the consumer's finger print or iris, and/or other unique identifier (e.g., a unique user name), etc., and device data (e.g., IP address and other identifiers and/or data associated with and/or related to the device, etc.). In some instances, the digital ID may be a combination of these values, a unique identifier that links to, includes, or is associated with the set of information. Once registered, the digital ID may be considered or treated a master digital ID used by the partnership system to uniquely identify the particular consumer in combination with the consumer's device in interactions with the trusted mobile device and throughout the trusted network. In addition to the master digital ID, each customer can have a unique customer-specific digital ID generated for them, where the customer-specific digital IDs are used by the various customer systems to interact with the partnership system while avoiding potential issues that can result when one or more customers are compromised. In other words, the digital ID represents a unique identifier or key that is created to tie an individual consumer's PII, device, and activities together, and that allows consumers to be identified without actual PII being transferred. The customer can retain management of decisions and enforcement related to the usage of the customer-specific digital ID and information and accounts associated with the digital ID at the customer. For example, how the customer configures or implements the solution is managed by the customer, thereby allowing customers to configure the solution as they see fit for internal operations. Additional participating entities associated with the partnership system can also use a linking to the master digital ID in the form of an entity-specific digital ID, in some instances provided by the partnership system,) for future transactions upon registration to the partnership system and sharing of the consumer's customer-specific account information as linked to the master digital ID.

The partnership system and the mobile trust application use data about the consumer's interaction with a particular digital interfaces of customer systems (e.g., mobile applications, websites, other suitable entry points) combined with data about the registered mobile device (e.g., geographical location, software installed, etc.) to authenticate the consumer. In addition to this authentication, additional analysis on the consumer can occur within the partnership system to evaluate the type of transaction the consumer is performing in connection with (1) one or more evaluation rules, which may be set or selected by the customer, and/or (2) potential fraud indicators. Depending on the type of transaction and the results of the additional analyses, the partnership system can determine if additional degrees of friction or interactions are required by the consumer prior to authorizing the requested transaction based on the customer-specified evaluation rules and potential fraud indicators.

In general, the solution can enable customers to implement context-based adaptive authentications. Typically, security is placed at the entry to the website or at a location prior to allowing access to data being protected. After successfully authorized (e.g., after using obtained credentials or otherwise overcoming security measures), potentially malignant users may be free to operate and interact with the compromised system and/or data. With the present solution, adaptive authentication is provided to require varying levels of security on a context-based need or rule. Several example transactional experiences are provided herein, although any number of experiences are considered and included in the present disclosure.

A consumer attempts to login to a customer website. In response to the attempted login, the partnership system pushes a message to the consumer (via the mobile trust application) to verify if he or she is trying to login to the account at the customer's website. The consumer can select "yes" or "no" in response and prior to the login being accepted and authorized.

A consumer logs into a customer website on a desktop or system other than the mobile device. The partnership system evaluates the digital information on the website and information on the location of the mobile device (and any other suitable information) to determine whether the mobile device is physically nearby the consumer. If so, the partnership system allows and approves a login of the consumer without further consumer interaction.

A consumer logs into a customer website and initiates a transaction, where the customer is associated with a customer-defined heightened security/authorization rule for transactions over the particular amount. The partnership system identifies the transaction and applies the customer-defined rule by pushing a request to consumer's mobile device to obtain additional authentication, such as a biometric data request (e.g., a fingerprint or voice analysis) or an ID authentication quiz. If the additional ID authentication request is passed, the transaction request is authorized by the partnership system and the transaction can then be approved and completed at the customer web site and systems subject to normal approval.

A fraudster has possession of the consumer's mobile device and the code to unlock the device. While in possession, the fraudster attempts to log into the customer website using the consumer's mobile device while outside a traditional location associated with prior consumer logins as monitored by or known to the partnership system. The partnership system evaluates the incoming request and website information associated with the login and determines that the request for the login originates outside the consumer's usual location area of interaction (e.g., outside the consumer's country of residence, outside a city typically associated with the consumer's location, etc.). In response, the partnership system can push a message to the consumer via the mobile trust application in a request to authorize the login. Because the consumer is not the originator of the login request, the partnership system can request further authentication via the mobile trust application, such as a password, question/answer challenge, or biometric information, where the fraudster would not be able to supply the necessary additional requirements to successful authenticate the consumer.

While these are four examples of potential scenarios, it is noted that the types of activities associated with heightened security and authentication requests with the partnership system may be actively managed, such that any particular interaction with customer systems can be associated with relatively higher and/or lower levels of authentication as identified by the customer and/or the partnership system. Additionally, in situations where the partnership system identifies a potential fraudulent attempt outside of defined authentication requirements and regardless of the particular activity, further authorization interactions may be generated or initiated by the partnership system to stop potentially fraudulent access of any particular data, regardless of whether the particular activity or interaction is associated with a high or low level authentication-related action.

The described system therefore utilizes a combination of authentication methodologies and technologies, including analytics and modeling of individual and cohort-based considerations to bring a holistic view of the consumer. That holistic understanding of the consumer—from data about the device, the interface with customer's systems, and the activity regarding the consumer's current and historical activities across the digital ID network, among others—provides a unique and novel solution to business, governmental, and other entities.

Turning to the illustrated implementation, FIG. 1 is a block diagram illustrating an example system 100 for implementing a digital ID network across a plurality of consumers (also referred to as "users") and customers. As illustrated in FIG. 1, system 100 is a client-server and device-client system capable of sharing and communicating information across a set of devices (e.g., one or more mobile devices 101, one or more customers 130, and a partnership system 160 via network 120). In the present illustration, one or more partnership systems 160 may provide the digital ID network, where one or more customers (e.g., business and/or government entities) perform transactions with one or more consumers or users associated with the particular mobile devices 101. Although components are shown individually, in some implementations, functionality of two or more components, systems, or servers may be provided by a single component, system, or server. The partnership system 160 provides consensus-based authentication, where several relatively small data points can represent a larger picture instead of relying solely on knowledge factors. Further, the data points can span across different partners in the network of participants associated with the partnership system 160, including information related to an unusual volume of interactions across the network for a given set of PII and/or device (e.g., a change of address combined with a re-registration of a new device), a high volume of rejected transactions associated with one or more systems associated with the partnership system 160, a previously-identified set of data identifying the PII as a potential high risk, a relatively low volume of knowledge associated with the PII information, or a device signature mismatch (e.g., primary and secondary channel signatures fail to match), among others.

As used in the present disclosure, the term "computer" is intended to encompass any suitable processing device. For example, both customer system 130 and partnership system 160 may be any computer or processing device such as, for example, one or more servers, blade servers, general-purpose personal computers (PC), Mac®, workstations, UNIX-based workstations, or any other suitable devices. Moreover, although FIG. 1 illustrates a single partnership system 160, partnership system 160 can be implemented using two or more systems, as well as computers other than servers, including a server pool. In other words, the present disclosure contemplates computers other than general-purpose computers, as well as computers without conventional operating systems. Similarly, the mobile device 101 may be any system which can be bound to the user associated therewith, and can include a mobile device, a tablet, a smartwatch, or any other suitable mobile computing device specifically associated and bound to the particular user registered in the digital ID network. In some instances, non-mobile devices, if suitable, can be associated with and bound to a particular digital ID. Additionally, while not shown, one or more additional systems may be used by the user to access particular customer systems 130. In those instances, the interactions between the user and the customer systems 130 may be performed by other computers, including desktop computers, other mobile devices, and any other suitable computer. The partnership system 160 can analyze the digital ID submitted and determine whether and how additional interactions with the mobile device 101 may be required to fully authenticate the user. In general, each illustrated component may be adapted to execute any suitable operating system, including Linux, UNIX, Windows, Mac OS®, Java™, Android™, Windows Phone OS, or iOS™, among others. In some instances, two or more separate partnership systems 160 may also be provided.

In general, the mobile device 101 is used as a particular device bound to a particular user whose digital ID is used within the digital ID network provided by the partnership system 160. The mobile device 101 comprises an electronic computing device operable to receive, transmit, process, and store any appropriate data associated with environment 100 of FIG. 1. In particular, the mobile device 101 can execute one or more general mobile applications 104, a mobile trust application 105 used to verify and authenticate the user's identity via the mobile device 101, and any other suitable components and/or operations.

As illustrated, mobile device 101 includes an interface 102, a processor 103, a mobile application 104, a mobile trust application 105, a GUI 108, one or more input devices 109, a location module 112, a camera 118, and memory 113. The interface 102 is used by the mobile device 101 for communicating with other systems in a distributed environment—including within the environment 100—connected to the network 120, e.g., customer system(s) 130, the partnership system 160, and other mobile devices 101, as well as other systems communicably coupled to the network 120. Generally, the interface 102 comprises logic encoded in software and/or hardware in a suitable combination and operable to communicate with the network 120. More specifically, the interface 102 may comprise software supporting one or more communication protocols associated with communications such that the network 120 or interface's hardware is operable to communicate physical signals within and outside of the illustrated environment 100. Still further, the interface 102 may allow the mobile device 101 to communicate with the partnership system 160 or a customer system 130 to perform operations related to the present disclosure.

Network 120 facilitates wireless or wireline communications between the components of the environment 100 (e.g., between the mobile device 101 and the partnership system 160, between mobile device 101 and the customer system(s) 130, and between the customer systems 130 and the partnership system 160), as well as with any other local or remote computer, such as additional mobile devices, clients, servers, or other devices communicably coupled to network 120, including those not illustrated in FIG. 1. In the illustrated environment, the network 120 is depicted as a single network, but may be comprised of more than one network without departing from the scope of this disclosure, so long as at least a portion of the network 120 may facilitate communications between senders and recipients. In some instances, one or more of the illustrated components (e.g., the partnership system 160 itself and/or one or more of the customer systems 130) may be included within network 120 as one or more cloud-based services or operations. The network 120 may be all or a portion of an enterprise or secured network, while in other instances, at least a portion of the network 120 may represent a connection to the Internet. In some instances, a portion of the network 120 may be a virtual private network (VPN). Further, all or a portion of the network 120 can comprise either a wireline or wireless link. Example wireless links may include 802.11a/b/g/n/ac, 802.20, WiMax, LTE, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the mobile device 101 includes a processor 103. Although illustrated as a single processor 103 in FIG. 1, two or more processors may be used according to particular needs, desires, or particular implementations of the environment 100. Each processor 103 may be a central processing unit (CPU), an application specific integrated circuit (ASIC), a field-programmable gate array (FPGA), or another suitable component. Generally, the processor 103 executes instructions and manipulates data to perform the operations of the mobile device 101. Specifically, the processor 103 executes the algorithms and operations described in the illustrated figures, including the operations performing the functionality associated with the mobile device 101 generally, as well as the various software modules (e.g., the mobile application 104 and the mobile trust application 105), including the functionality for sending communications to and receiving transmissions from the customer systems 130 and the partnership systems 160, as well as to other mobile devices and systems.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Mobile device 101 executes a mobile application 104 operable to perform any suitable functionality for the mobile device 101. In some instances, multiple mobile applications 104 may be included in and executed on the mobile device 101, such as mobile apps executing in mobile OS systems. In some instances, one or more of the mobile applications 104 may be operable to interact with one or more of the customer systems 130. In some instances, those applications may be developed and provided by the customer associated with the customer system 130 (e.g., a dedicated mobile application, such as those downloaded or obtained from an app store), while in others, the applications 104 may be or be associated with a general mobile browser or application capable of mobile browsing, where particular interactions with the customer systems 130 may be optional if directed to a website or system associated with the customer system 130. In some instances, interactions with the customer systems 130 may be performed by another system associated with the user, but not linked to the digital ID of the user. In those instances, the partnership system 160 can connect to the mobile device 101 via the mobile trust application 105 to access and obtain information about the user and the mobile device 101, where and when needed.

The mobile trust application 105 represents a mobile application or combination of applications dedicated to providing a secure link between the user and the mobile device 101, where the user's digital ID as described herein is bound to the mobile device 101 during a registration process executed by the registration module 106. The registration process can be initiated based on a user's interactions with a particular customer application 133, where the option to register a new digital ID may be presented via one of the mobile applications 104, or through a separate channel (e.g., via another device or another application other than via the mobile trust application 105). During registration (as described in one example implementation in FIG. 3), the user can, via the customer system 130, provide personally identifiable information (PII) that uniquely identifies the user (e.g., name, address, date of birth, social security number (SSN), driver's license number, etc.) to the partnership system 160. The partnership system 160 can, via its various components and functionality described below, evaluate and confirm the user's PII to verify the identity of the user. At the same time, the partnership system 160 can evaluate potential fraudulent risks associated with the user based on the initial set of information provided and/or any prior information about the identified user (e.g., from existing industry or governmental databases and reports, such as credit bureaus, criminal databases, etc.). If the user is approved to meet or exceed the risk requirements of the partnership system 160, the partnership system 160 can generate and provide, via the customer system 130 (or through any other suitable method), a unique code (e.g., a QR code) or other token or identifier that may be associated with the user, including but not limited to mobile phone carrier data, for the user to capture via the mobile trust application 105. The unique code (or a suitable representation thereof) can be captured, for example, by a camera 118 integral to or associated with the mobile device 101 as accessed through the mobile trust application's functionality. Alternatively, the mobile trust application 105 may be able to access a camera roll or photo library of captured images to identify and upload the unique code (or a suitable representation of the unique code as provided) back to the partnership system 160. In embodiments employing non-visual unique codes (such as a token or identifier), the unique code may be captured and responded via recognition and/or de-encryption mechanisms as appropriate. In response to the confirmation that the unique code (or the representation thereof) is captured by the mobile trust application 105, the partnership system 160 can view the mobile device 101 as a trusted device, and, via a key management application 170 of the partnership system 160, a private key 115 specific to the authorized digital ID of the user can be generated and stored at the mobile device 101. A corresponding customer-specific digital ID or other unique identifier can be provided to each customer interacting with or having an account associated with the user, such that any customer interactions with the partnership system 160 can link the customer-specific identifier to the master digital ID. The customer-specific digital ID can then be used at any customer system 130 associated with the partnership system 160, where the partnership system 160 can evaluate transaction requests using the secure evaluation system described herein using the link to the master digital ID for the particular user/consumer.

The mobile trust application 105 as illustrated also includes an authentication module 107. The authentication module 107 can be used, for example, in association with transaction attempts at customer systems 130 including in the digital ID network to provide mobile device details and information to the partnership system 160 during or in association with the transaction request, to present additional authentication requests/challenges to users via the mobile device 101 in response to heightened security transactions (as predefined by the customer systems 130) or in response to determinations of potential fraud associated with particular transactions by the partnership system 160, and to provide responsive inputs to the additional authentication requests/challenges presented via the mobile trust application 105. In some instances, those additional authentication requests/challenges can be presented to users via GUI 108.

GUI 108 of the mobile device 101 interfaces with at least a portion of the environment 100 for any suitable purpose, including generating a visual representation of a mobile application 104 and/or the mobile trust application 105. In particular, the GUI 108 may be used to view and navigate various screens, e.g., Web pages, located both internally and externally to environment 100, as well as to view and navigate through information accessed by either one of the mobile applications 104 and/or the mobile trust application 105, such as information stored at or associated with one or both of the customer system(s) 130 and the partnership system 160, among others. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with information related to the operations of the process associated with the mobile trust application 105 and its authentication processes. The GUI 108, for example, may be where the user is provided further authentication questions/challenges and is able to provide feedback (e.g., answers) to the partnership system 160. In some instances, the GUI 108 may be associated with one or more input devices 109, including a biometric reader 110 (e.g., a fingerprint scanner, facial recognition, voice recognition/commands, etc.) or a touch-screen/keypad 111 (as well as other buttons, inputs, etc.) to allow for responsive feedback and interactions to the authentication questions provided. Additionally, the GUI 108 may present information associated with one or more of the mobile applications 104 for viewing and interaction with one or more customer systems 130. In general, the GUI 108 is often configurable, supports a combination of tables and graphs (bar, line, pie, status dials, etc.), and is able to build real-time portals and presentations, where tabs are delineated by key characteristics (e.g., site or micro-site). Therefore, the GUI 108 contemplates any suitable graphical user interface, such as a combination of a generic web browser, intelligent engine, and command line interface (CLI) that processes information in the platform and efficiently presents the results to the user visually. Additionally, the GUI 108 can also allow the consumer to manage his or her own security preferences via the mobile trust application 105. For example, the consumer could lock down or otherwise secure items associated with the consumer's digital wallet while on military deployment or traveling for an extended period, such that any attempted transactions associated with the consumer's digital ID may be rejected or otherwise require additional authentication.

A location module 112 can be included within the mobile device 101, and can be used to identify a particular location at which the mobile device 101 is currently and has been historically located. The particular current location of the mobile device 101 may be provided to the partnership system 160 (e.g., through the passed transaction request from the customer system 130 or through the mobile trust application 105). If the current location of the mobile device 101 is different than the location at which the request was received (e.g., via a channel apart from the mobile device 101), the partnership system 160 may detect a potential fraud occurrence, and can initiate procedures to perform additional authorization operations, including sending a confirmation or other challenge to the mobile device 101 via the mobile trust application 105. Additionally, if both the transaction request and the mobile device 101 are identified as originating and being located in a different location than normally associated with the user (e.g., out of the country, a certain distance from all previous locations, etc.), one or more fraud alerts may be identified by the partnership system 160. The location module 112 may be used to identify a particular physical location of the mobile device 101 or a logical or relative location of the mobile device 101 (e.g., based on detected nearby wireless networks, connections to one or more other computers or systems, check-ins or other location-based information, etc.)

Memory 113 of the mobile device 101 may represent a single memory or multiple memories. The memory 113 may include any memory or database module and may take the form of volatile or non-volatile memory including, without limitation, magnetic media, optical media, random access memory (RAM), read-only memory (ROM), removable media, or any other suitable local or remote memory component. The memory 113 may store various objects or data, including financial data, user information, administrative settings, password information, caches, applications, backup data, repositories storing business and/or dynamic information, and any other appropriate information associated with the mobile device 101 including any parameters, variables, algorithms, instructions, rules, constraints, or references thereto. Additionally, the memory 113 may store any other appropriate data, such as VPN applications, firmware logs and policies, firewall policies, a security or access log, print or other reporting files, as well as others. For example, memory 113 can store one or more private keys in a private key store 114 located in memory 113, as well as a set of personally identifiable information (PII) 116, and a set of device-specific information 117. The private key store 114 may include private keys associated with one or more customer systems 130, as well as a private key 115 corresponding to the digital ID generated and provided by the partnership system 160. The PII 116 may be stored at the mobile device 101, or may be provided by the user in response to particular requests for the PII 116. In some instances, the PII 116 may represent a link to particular PII the mobile device 101 is associated with, such that no PII is stored on the device other than what the consumer has stored there him or herself. The set of device-specific information 117 can be used to provide a fingerprint or identity of the mobile device 101 (e.g., based on installed software, system information, etc.) that can be used in part to identify the mobile device 101. This information can be shared by the mobile trust application 105 to the partnership system 160 at registration and, in some cases, in response to particular requests for additional authentication information to validate/authenticate the mobile device 101.

As illustrated, FIG. 1 includes one or more customer systems 130. Each customer system 130 can be associated with the digital ID network and can accept authorizations based on the digital IDs provided by the mobile devices 101. Customers can include for example, without limitation, banks, financial institutions, online merchants, governmental systems, health insurance companies, and doctor offices, among others. The customer systems 130 can register with the partnership system 160 to employ and accept the digital IDs as replacements or alternatives to traditional login information for users. Initially, each customer system 130 may have an existing trust relationship with particular users (e.g., those associated with the mobile devices 101) before the digital ID is generated. In those instances, users may be provided the option to perform the registration options described herein to bind the mobile device 101 of the consumer to the digital ID and mobile trust application 105. Each customer system 130 may provide at least one particular customer application 133 (or website) that can be accessed and interacted with by users, where the particular customer applications 133 can be accessed based on the user's possession of the digital ID used across the digital ID network.

Each customer system 130 includes an interface 131, a processor 132, and memory 140, which may each be similar to or different than the interface 102, processor 103, and memory 113 respectively described in the mobile device 101. Interface 131 provides the customer system 130 with communications to the components and systems of environment 100, including the ability to communicate with the mobile device 101, partnership system 160, and any other systems or computers via network 120. In general, processor 132 executes instructions and manipulates data to perform the operations of the customer system 130. Specifically, the processor 132 executes the algorithms and operations described in the illustrated figures, including the operations performing the functionality associated with the customer application 133. Memory 140 may be similar to or different than memory 113.

As illustrated, the customer system 130 is used to receive, manage, and interact with various users through any number of interactions, including through mobile devices 101 (e.g., mobile application 104) or any other suitable computing system. The customer application 133 may access and provide operations associated with sensitive consumer records 142 stored in a consumer database 141 (in memory 140, which may be similar to or different than memory 113, and in some cases, may be at least partially located remote from the customer system 130), where the consumer records 142 may include, for example, business and government information, including financial, health, business, government, or other related information, where the operations of the customer application 133 are such that security concerns and procedures may be advantageous to use. Additionally, the customer application 133 may be associated with various websites, and can be used to access or post to message boards, online mail programs, online productivity software, as well as any other software, applications, or systems. The consumer database 141 can store information relevant to particular customer application-related information, as well, including consumer data and history information 145. Still further, the customer application 133 may be associated with transactional and other business systems, such as enterprise software systems including customer relationship management systems, supplier management systems, procurement systems, human resources systems, and supply chain systems, among others. The consumer records 142 may be associated with an internal ID 143 previously used to enter the trust relationship, which may be associated with a particular username/password combination, as well as other suitable identifiers used within the customer system 130. Upon generation of the digital ID, the consumer records 142 can be updated to include a partnership ID 144, which can allow the customer system 130 to correspond with the partnership system 160 regarding particular users/consumers, allowing for quick accessing and analysis of particular users and transactions. The partnership ID 144 can be a unique key and/or globally unique identifier (GUID) that is used to link the customer system's internal IDs 143 to the digital ID used by the partnership system 160 and received from users when the digital ID is provided for authentication of particular transactions, including logins and other operations.

In some instances, some or all of the consumer data and history 145 may be shared with the partnership system 160. As multiple customer systems 130 store information associated with particular users, a better holistic view of those users can be provided where that information is shared and available to all systems. By sharing at least some of the consumer data and history 145 from various customer systems 130, the partnership system 160 can provide better tracking and fraud detection.

Memory 140 may also include a set of partnership logic rules 146. The partnership logic rules 146 can define settings and customer-specific selections/subscriptions of potential authentication operations to be performed by the digital ID network for interaction with the customer application 133 and consumers attempting transactions with the customer system 130. For example, the partnership logic rules 146 can include a set of action authentication rules 147 which are defined by administrators at the customer system 130 and coordinated with the partnership system 160, where those rules 147 define particular transactions or operations that may require an additional layer or level of authentication from the user, such as through the mobile trust application 105. In some instances, the particular types of further authentication needed from the user may be specified in the action authentication rules 147, such that the customer system 130 can determine and request particular authorization requests via the partnership system 160. In some instances, the allowable additional authorization requests may be based on the techniques available at the partnership system 160 and/or the particular techniques to which the customer system 130 is subscribed or allowed to use. For example, a customer may choose to use a biometric-based authentication for particular transactions, while electing not to provide a question-and-answer challenge. These may be instances where the type of transaction is subject to higher levels of fraud, and where the biometric authentication steps provide a more secure confirmation of identity of the user/consumer associated with the transaction.

In some instances, the action authentication rules 147 can provide information and/or internal rules on how, upon receiving a score or evaluation from the partnership system 160, particular transactions are to be handled. Scores received from the partnership system 160 may be relative or absolute, and can be interpreted by the customer system 130 according to the rules 147 as to whether the transaction should be allowed or denied based on the results, whether additional authentication is required, and any other suitable analysis or rules, including particular verbiage or notifications to be provided to the user/customer. In some instances, the score required to authorize a particular type of transaction may differ between transaction types, based on user/consumer information, or based on other contexts and/or information, both specific to a particular consumer and generally based on recent interactions with a plurality of consumers. These variations can be included in the action authentication rules 147 and can be used to vary the requirements for particular transactions. In some instances, the partnership system 160 may determine that a potentially fraudulent activity is occurring outside of the defined rules 147 of the customer application 133 (e.g., based on the mobile device 101 location, based on recent and/or previous fraudulent activity on another customer system 130, or based on other criteria), such that a further evaluation is required. The rules 147 may define when the fraud evaluation results can trigger further verification, or the process may automatically be triggered by the partnership system 160.

As illustrated, the partnership logic rules 146 may also include one or more request templates 148, where the request templates 148 are used to define how information associated with a particular transaction is provided to the partnership system 160. For example, for each type of request, a different request template 148 may be available and used to identify the user/consumer-relevant information to be provided. The request template 148 can be populated at runtime with the partnership ID 144 of the user/consumer for reference by the partnership system 160, and, in some instances, the request template 148 may further identify a particular type of analysis and/or further authentication to be performed. In other instances, the type of analysis and/or further authentication may be determined by the partnership system 160 based on previously-shared customer system 130 selections. As such, the partnership logic rules 146 may be stored fully at the customer system 130, or at least some of the rules 146 may be located at the partnership system 160 where appropriate. In any event, the customer can invoke and set the appropriate rules to ensure the customer's level of authentication is met for each type of transaction and/or context.

Returning to the customer application 133, the application 133 can be used to perform any relevant operations and functionality associated with customer system 130. The customer application 133 as illustrated includes a consumer interface 134 and a partnership interface 136. The consumer interface 134 provides the interface for interactions with the user/consumer through any suitable channel, including via the mobile application 104 of the mobile device 101 or through another system (e.g., as functionality of a website or through a dedicated application or app). The consumer interface 134 can include or be associated with a registration support module 135, where the opportunity to register with the partnership system 160 can be presented and assistance with the registration provided. The registration support module 135 can manage the passing of information to and from the user (e.g., through whichever channel interactions occur) and present information back to the user/consumer as needed, including the unique code generated by the partnership system 160. The registration support module 135 can provide a link or access to the mobile trust application 105, or can assist in sending a link to the mobile device 101 for downloading of the application 105 via text, email, or any other method where the initial interaction does not occur via the mobile device 101. If the user/consumer is already registered, the consumer interface 134 may match credentials provided by the user/consumer to a particular customer-specific ID as a login or transaction authentication technique. Whenever the customer would like to perform a risk-based authentication with the customer, the consumer may pass its digital ID to the partnership system 160. The customer-specific ID (which is different from the digital ID managed by the partnership system 160) can be used to access internal operations and data at the customer level and with the customer system 130. The customer-specific ID can be provided to the partnership system 160 where authentication is required and/or where appropriate. By storing the digital ID internal to the partnership system 160 and not providing to the customer, the risk of compromising the entire keyset if a single customer is compromised is mitigated.

The customer application 133 also includes a partnership interface 136 for interacting with and taking advantage of the operations of the partnership system 160. The partnership interface 136 can allow the customer application 133 (and other customer applications) to interact with the digital ID network through communications with the partnership system 160, and may be used to interpret the partnership logic rules 146, prepare and send requests to the partnership system 160 according to those requests, and subsequently interpret communications from the partnership system 160 to react to the ID verification and fraud detection results, as appropriate. The partnership interface 136 can include a registration module 137 to communicate with the partnership system 160 when registering a new user/consumer. The partnership interface 136 can also include a customer management module 138, where the management module 138 allows administrators at the customer system 130 to modify the customer-specific partnership logic rules 146, subscribe to particular verification techniques, and otherwise manage interactions with and available parameters of the partnership system 160. The partnership interface 136 includes an authentication interface 139 which can handle the sending and receiving of authentication information received by the customer system 130 from the user/consumer to the partnership system 160 to provide the authentication operations of the digital ID network.

In general, the illustrated modules of the customer systems 130, the partnership system 160, or the mobile device 101 may be combined into a single application or module, in some instances. As noted, some of the software and stored information may be located or available remotely from the illustrated and described systems, including in a cloud-based system.

The partnership system 160 performs operations associated with holistically accessing particular transactions received from one or more customer systems 130 associated with particular users, verifying the identity of the users, evaluating any potential fraudulent activity, and providing additional levels of security requests and confirmation where specifically elected by individual customer systems 130 or where a potential set of fraudulent activities are identified. While illustrated as a single system, the partnership system 160 may be comprised of multiple systems, functions, modules, and software, where appropriate.

As illustrated, the partnership system 160 includes an interface 161, a processor 162, a consumer interface application 163, a customer interface application 171, a customer-specific analysis module 173, a third-party system interface 178, and memory 179. The interface 161, processor 162, and memory 179 may be similar to or different than the interfaces 102, 131, processors 103, 132, and memories 113, 140 described for the mobile device 101 and customer systems 130, respectively. In general, processor 162 executes instructions and manipulates data to perform the operations of the partnership system 160, including the execution of the algorithms and operations described in the illustrated figures.

The partnership system's 160 consumer interface application 163 is used to interact with the consumer through registration (via the mobile device 101 and/or any additional channels in which the registration process was initiated through, e.g., a website connection on a desktop computer) and interactions association with authentication operations. As illustrated, the partnership system 160 includes a registration module 164, an authentication module 168, and a digital wallet management module 169.

The registration module 164 can allow the user/consumer to perform the necessary registration operations as described herein. In some instances, interactions with the customer system 130 may initiate interactions between the registration module 164 and the consumer. In some instances, operations performed prior to installing the mobile trust application 105 may be performed via the customer system 130 with which the registration process was initiated, or through a web-based interface with the partnership system 160 (not illustrated). A unique identifier generator 165 can generate unique identifiers (e.g., QR codes) that can be used to uniquely identify particular users in the registration process who have been initially authenticated during the registration process. The registration authentication module 166 can obtain or access obtained PII provided by the consumer (e.g., via the customer system 130) and perform (1) an identity verification process and (2) an initial fraud evaluation process. The identity verification process can be managed by the registration module 164 by, for example, accessing one or more public or private databases or other third-party systems 190 to confirm the identity of the user/consumer. During, before, or after the identity verification process, the registration authentication module 166 can perform the initial fraud evaluation process associated with the user/consumer to screen against identity elements associated with fraud. In some instances, the module 166 may check to determine whether the identity provided (and potentially verified) has been associated with prior fraudulent activity, or if the identity or PII information has been associated with one or more cybersecurity breaches in the public or private sector. Credit bureau checks may be initiated in some cases to determine if fraudulent activity associated with the PII has been previously reported. Other and alternative methods may be used to determine whether the identity or person is a potential fraud risk, including matching PII associated with the user/consumer to known high-risk PII, partner PII, carrier PII, and other available sources. Velocity information related to the PII (e.g., transactional velocity and/or behavioral velocity) can also be evaluated and considered. Other data sources can also be leveraged in the initial analysis, as appropriate. In some instances, the registration authentication module 166 may access the consumer analysis module 175 to perform the initial ID verification and fraud evaluation operations.

Once the identity is verified and the potential risk of fraud associated with the identity is determined to be within acceptable thresholds per system requirements, the unique identifier can be generated and/or associated with the identity. As described, the unique identifier can be provided to the user/consumer via the channel through which the registration process was initiated, and instructions can be provided to the user/consumer to download the mobile trust application 105 and subsequently capture an image of the unique identifier (and/or an encoded version of the unique identifier) via the application 105. The captured image can be provided to the partnership system 160 from the mobile trust application 105 in a second communication channel that is different from the channel through which the registration process initiates. Upon verification that the captured image corresponds to the uniquely generated identifier or that the captured image includes the encoded uniquely generated identifier, the mobile device 101 can be considered registered. In some instances, a private key (e.g., private key 115) can be generated for the mobile device 101. Additionally, the unique digital ID can be considered registered and made available for use in partnership-associated customer systems 130. An identity linking module 167 can perform and/or manage the association of the particular user/consumer to the mobile device 101. A key management application 170 of the partnership system 160 can generate a GUID—i.e., the partnership ID 144—for use by the customer system 130 associated with the registration. As additional customer systems 130 associated with the partnership system 160 are used by or interacted with the user registered in the system, additional unique keys can be generated and provided to those other systems 130 by the key management application 170. As partnership IDs 144 are different at each customer system 130, if a particular partnership ID 144 is exposed or lost, the partnership system 160 can simply generate a new partnership ID 144 corresponding to the particular system 130 needing a new GUID without requiring the registration process to be performed again. As authentication and validation requests are provided by the customer systems 130, the GUID corresponding to the user from those systems 130 can be included in the request and identified at the partnership system 160.

The authentication module 168 can manage authentication operations performed after the initial registration, and can manage the sharing and verification of additional authorization operations between the partnership system 160 and the mobile device 101. The authentication module 168 can communicate with the mobile trust application 105 in a secure manner, providing the additional authentication requests to the mobile device 101 and receiving the responses in return.

The digital wallet management module 169 can allow users/consumers registered with the partnership system 160 to manage their digital wallets, review the associated customer systems 130 in which their digital ID can be used, update information about the user/consumer themselves, and perform any number of account management activities. The ability to monitor and manage the information associated with themselves can allow significant freedom and protection to the user, including information on potential fraudulent transactional attempts identified by the partnership system 160, including with which customer systems 130 those attempts occurred as well as information in possession of the potential attackers, among other data.

The customer interface application 171 is used by the partnership system 160 to interact with the customer systems 130 during registration, for performing authentication and fraud monitoring, and to allow administrators and authorized users to update and manage particular customer-specific rules and operating parameters. In some instances, communications from the customer systems 130 may be received at the customer interface application 171, which may include or be associated with one or more application programming interfaces (APIs) and/or other endpoints to which communications can be provided by the customer systems 130. In some instances, the received communications can be represented as requests (based on the request templates 148), where the customer system 130 is identified along with the unique partnership ID 144 associated with that particular customer system 130. In some instances, the particular authentications to be performed are identified in the requests, while in other instances, the customer interface application 171 can use one or more customer-specific authentication rules 186 stored in memory 179 to perform the analysis. In some instances, a combination of customer-stored and partnership-stored rules may be used. When a request is received from a customer system 130, the customer interface application 171 can provide the request to the customer-specific analysis module 173. When a customer system 130 requests to interact with their customer system 130 account, the customer management interface 172 can be executed by the partnership system 160 to determine how to operate for the particular customer, including the ability to update/review which authentication techniques are to be used when, or to modify parameters of particular operations to be performed.

The customer-specific analysis module 173 may be a separate module from the customer interface application 171, or a portion thereof. The customer-specific analysis module 173 can manage the evaluation of the particular analysis request received from a particular customer system 130, where the module 173 interprets the request, its contents, and any associated metadata to determine how to process the request. The analysis type determination 174 of the module 173 uses information in and context about the request to determine the type of analysis to be performed on the transaction provided by the customer system 130. In one example, the analysis request may include an explicit indication of the type of transaction to be analyzed and information about which authentication techniques are to be applied. In other instances, the request may include implicit information related to the transaction request, such that the analysis type determination 174 may need to determine the type of transaction request to be performed. In some instances, the request may include the specific authentication techniques to be applied to the transaction request, while in others, the determined type of transaction may be cross-referenced to one or more of the customer-specific authentication rules 186 to determine the type of additional authentication that may be required/desired by the customer system 130.

The consumer analysis module 175 can perform the particular analysis of the consumer as required or requested by the customer system 130. In some instances, one or more ID verification operations may be further performed, or information about the request may be evaluated. A scoring module 176 can generate a relative and/or absolute score for the user and the request, where particular thresholds (relative or absolute) can determine whether issues are identified and if additional verification and authentication may be required. A fraud evaluation engine 177 can compare the transaction request and associated information with an ongoing analysis of the consumer's records, along with information associated with the transaction request, including information obtained regarding the mobile device 101 itself. For example, the fraud evaluation engine 177, in response to receiving a transaction request associated with a particular user/consumer, may obtain information regarding the status of the mobile device 101, either from the mobile trust application 105 or from information included in the transaction request. The fraud evaluation engine 177 can compare known and/or recent information associated with the user/consumer to identify whether any potential fraudulent behavior can be identified. In some instances, each transaction request may have a fraud detection evaluation performed on it, while in others, only some of the transaction requests may be evaluated for fraud (e.g., when a particular customer-specific authentication rule 186 calls for such an evaluation). The fraud evaluation engine 177 can base the results of an evaluation on a set of fraud evaluation rules and patterns 185, which define a set of potential fraudulent flags or behavior patterns. The fraud evaluation rules and patterns 185 may define example changes or transitions in transactions based on the user/consumer's history, a particular set of transaction information that may be potential fraudulent, a comparison of mobile device 101 location compared to an expected or normal location, as well as any other suitable patterns and/or rules. By comparing the consumer's request, the device information associated with the mobile device 101 (e.g., absolute location, IP address, etc.) submitting the request, the transactional velocity of prior and recent transaction requests, particular transaction data, and other portions of the transaction and associated information, the fraud evaluation engine 177 can assist in determining instances of potential fraud. As noted, when multiple customer systems 130 are included in the digital ID network and obtain consistent and maintained information about particular users/consumers, the historical transaction data 184 (which can be stored in memory 179) can be used to assist in the evaluation. Additionally, the fraud evaluation rules and patterns 185 can be updated based on determined fraudulent behavior from users other than the current user/consumer, where determinations of fraudulent behavior with respect to the accounts of others can be used to identify new fraudulent behavior in the current user/consumer.

A number of the determinations performed by the partnership system 160 may rely on information stored outside, remote from, or external to the partnership system 160. In those instances, a third-party system interface 178 may be used to contact and obtain information from one or more third-party systems 190. The third-party systems 190 may be any system outside the partnership system 160 that stores information related to consumer accounts and data 191, particular trends in fraudulent behavior, including additional and alternative fraud evaluation rules and patterns, as well as other information relevant to the partnership system's evaluation of PII information for users/consumers and transaction data associated with particular transaction requests.

As illustrated, memory 179 of the partnership system 160 includes a set of ID verification options and rules 180, where those rules 180 can be used in the initial evaluation of the consumer at registration as well as when requiring further authentication during transaction requests. The rules 180 can define how such requests are presented to users, how responses to those requests are interpreted, and which requests are to be asked or analyzed in particular situations. Examples of ID verification rules 180 may include some or all of the following without limitation: a knowledge-based authentication (e.g., a question and answer combination), a cross-channel comparison (e.g., where two different channels, such as a primary channel for customers having their own GUI and a secondary channel represented by a trusted app in a bound device, such that signatures associated with the two different channels are compared, e.g., to ascertain an absolute or relative IP location of one channel in comparison the IP location of the other channel), out-of-band authentication (e.g., which may send an SMS or email verification message independent of the communication with the user's digital banking device), a known fraud exchange evaluation (e.g., a known fraud exchange such as known fraud on a government ID), an analysis of PII velocity (e.g., an out of ordinary pattern of usage for particular PII information), an analysis of transactional velocity for a particular user (or compared to a normal user), transaction data analysis, a biometric analysis (e.g., fingerprint analysis, voice analysis, facial recognition, etc.), PII associated with the device based on carrier membership (e.g., by accessing existing carrier-associated data sources to corroborate PII supplied by the customer), a suspicious or known IDs or other PII (e.g., based on maintained fraud analysis systems or infrastructures), and device reputation (e.g., where the device has been previously associated with one or more high risk transactions or the duration the device been associated with the user), as well as numerous other suitable ID verification rules. The customer-specific rules 186 can define which of these techniques are to be used in analyzing transactions.

As illustrated, a set of consumer-specific data 181 may also be maintained by the partnership system 160. Specifically, the set of consumer-specific data 181 can store a customer key table 182, where the digital IDs 183 of particular consumers are maintained and where the customer-specific GUIDs associated with those digital IDs are maintained after their generation and provision to the corresponding customer system 130. Further, historical transaction data 184 associated with consumers can be maintained and applied to future fraud evaluations, where appropriate. In some instances, the historical transaction data 184 can be mined and/or analyzed to determine risks across all customers and for all consumers. Historical information can, for example, be anonymized and used to evaluate fraudulent patterns, which can then be incorporated into the fraud evaluation rules and patterns 185 for future fraudulent evaluations.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
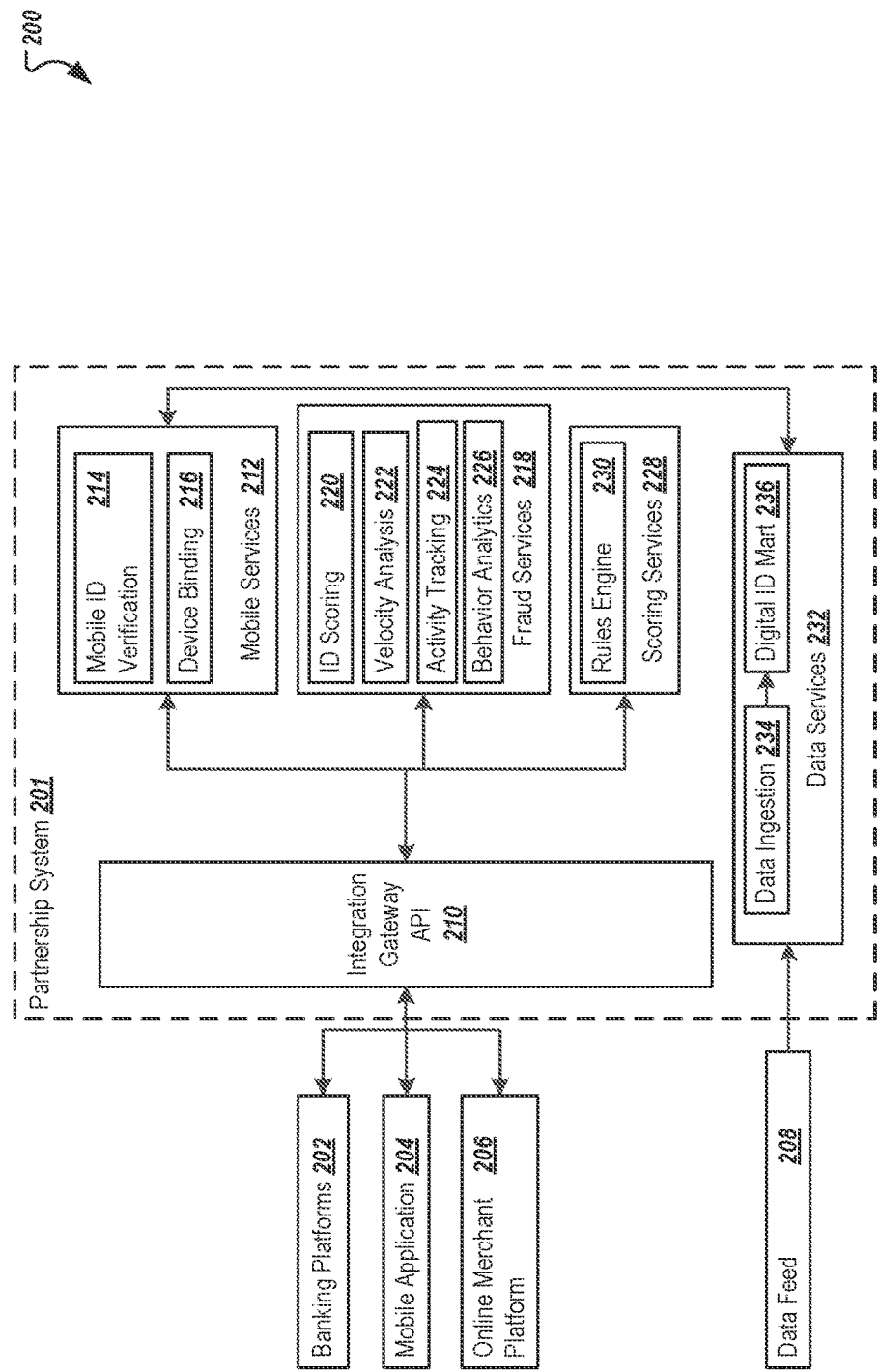
FIG. 2 is an example diagram of a simplified system for providing a digital ID network.

FIG. 2 is an example diagram of a simplified system 200 for providing a digital ID network. The illustration represents an example set of components performing operations similar to those described in FIG. 1, particularly in view of banking and online Banking platform 202, mobile application 204, and online merchant platform 206 represent three components of the digital ID network external to the backend partnership system 201, such as partnership system 160 illustrated in FIG. 1. The banking platforms 202 represent a set of banking solutions and operations associated with a plurality of banking systems, where the banking platforms 202 are associated with and perform standard banking operations for users registered with those banking platforms 202. The solution in the present disclosure allows for a single master digital ID to be used across the plurality of banking platforms 202 as described here, where each of the particular customers (e.g., banking platform 202, online merchant platform 206) are associated with a child digital ID associated with the single master digital ID for a particular consumer. For example, a bank-specific child digital ID may be used by a particular banking platform, while a different merchant-specific child digital ID may be used by a particular merchant 206. The mobile application 204 represents the mobile trust application (e.g., mobile trust application 105) used as the hub for the consumer-binding operations and further authentications performed by the system 200. The online merchant platform 206 represents, similar to the banking platforms 202, one or more merchant platforms integrating the digital ID network and allowing for transactions to be performed through use of the single digital ID while providing enhanced security and authentication techniques.

Information from the components (202, 204, 206) enters the system via an integration gateway API 210, where requests are received and responses and other interactions are sent from the partnership system 201. The integration gateway API 210 can have the capability to broker and manage trusted interactions between the banking platforms 202 and online merchant platforms 206 with the backend systems used by the partnership system 201, including each of the individual components used in the ID verification and fraud analysis processes.

A set of mobile services 212 are associated with the partnership system 201: the mobile ID verification module 214 and device binding module 216. The mobile verification module 214 has the capability and functionality to verify the identity of a particular consumer based on the PII as provided at registration. The mobile verification module 214 can verify the PII based on one or more internal and/or external databases and data sources, including those maintained by the manager or affiliated systems of the partnership system 201. The device binding module 216 can establish and provide a hard link (e.g., a key) associated with the device, where the link is shared between a particular user and their associated mobile device as described herein for authentication through the partnership system 201. Once the binding is established, the mobile device and information associated therewith may be used in evaluating particular transactions. Additionally, a secure channel between the partnership system 201 and the mobile application 204 installed at the mobile device can be used to request additional information and/or data for heightened levels of authentication.

The fraud services 218 can perform analyses of particular transactions in light of the particular transaction data, recent and related transactions performed by the particular consumer associated with a transaction and/or similarly situated or related consumer, information about a channel in which the transaction was requested as compared to information associated with the mobile device, as well as others. An ID scoring module 220 uses linking and keying technology across high quality data sources to evaluate and approve the digital ID across systems, allowing for frictionless risk-based authentication where available, and requesting further authentication when issues or potential fraud are identified. The velocity analysis module 222 detects suspicious and potentially fraudulent activity across financial institutions that may be indications of fraud, including an analysis related to the amount of attempted transactions in comparison to normal consumer user activity or in comparison to other users and consumer. Fraud-related pattern analysis may be used over the entirety of a consumer's interactions with banking and merchant platforms as available to evaluate the frequency of transactions and/or the amount of transactions associated with the digital ID. The activity tracking module 224 leverages real-time activity and device signature information (e.g., which can include specific characteristics about the device itself, including OS versions, jailbreak status, particular installed applications, hardware information, etc.) to detect suspicious behavior, including information about the location of the mobile device relative to a location where the transaction is requested. In some instances, this may be based on a comparison of IP addresses, absolute locations, and/or relative locations between the location of the transaction and the location of the device, as well as the location of other recent purchases and/or activities relative to the location of a requested transaction. Alternatively, a current location associated with the attempted transaction can be compared to a normal and/or expected location of the device, such that unexpected locations may be provided with additional scrutiny and analysis. The behavior analytics module 226 can allow for machine and/or self-learning algorithms to study normal or regular characteristics of a particular consumer or group of consumers, and compare certain real-time activities to those expected characteristics to determine whether potential fraudulent activity is occurring based on the timing, size, or location, among other characteristics, of particular transactions.

The scoring service 228 perform actions for determining whether additional authorization is required by the customer systems (e.g., the banking platforms 202 or the online merchant platforms 206) based on predefined requirements, and/or whether the identification of potential fraud or issues with ID verifications require further consideration. The rules engine 230 can provide a workflow capability to the partnership system 201, where data source information can be fed into customer-specific rules to determine analysis outcomes and identify next steps, including the request of additional information or verifications from the mobile application 204 before further transactions are approved.

Data feed 208 represents a data feed that provides financial institution data to the digital ID network and partnership system 201 on a predetermined and/or ongoing schedule. The received information can be used to update the evaluations of the partnership system 201 and its components, to update particular rules, and to keep the system 201 current. The data ingestion module 234 of the data services 232 can receive and update new data into the digital ID network, while the digital ID mart 236 provides an on-demand view of identity information associated with one or more consumers. The digital ID mart 236 can be used to create digital IDs for new registrants, including a "system-of-record" that can include activity information, device-specific information, PII information associated with the consumer, historical transactional data, and other information. Existing data sources can be leveraged in building the digital ID mart 236, such that already existing information about consumers can be built into their digital ID to provide immediate advanced analytics and analysis upon registration.

Figure 3:
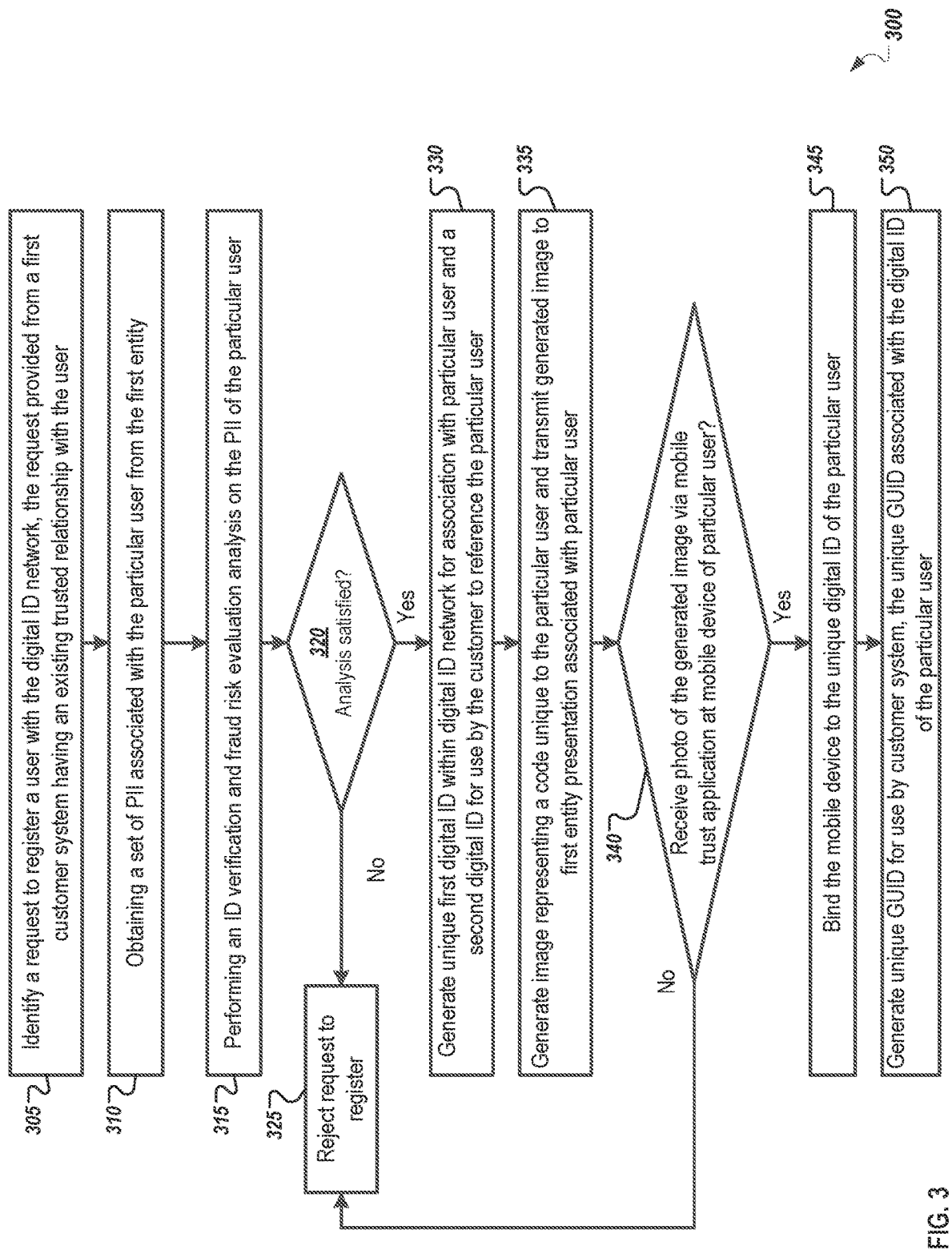
FIG. 3 is a flowchart of an example registration operation from the perspective of the partnership system.

FIG. 3 is a flowchart of an example registration operation from the perspective of the partnership system, such as partnership system 160. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a request to register a user with the digital ID network is identified, where the request is provided from a first customer system within the plurality of customer systems included in the digital ID network. Further, the particular user associated with the registration request may already have an existing trusted relationship with the first customer system.

At 310, a set of personally identifiable information associated with the particular user is obtained. The PII may be passed from the first entity, while in other instances, the information may be directly provided by the particular user. At 315, an ID verification and fraud risk evaluation analysis are performed for the particular user based on the obtained PII.

At 320, a determination is made as to whether the analysis is satisfied. In some instances, satisfaction of the ID verification and fraud risk evaluation may be based on an absolute or relative score being generated by the partnership system based on the available information, and whether that absolute or relative score exceeds a threshold value. In some instances, the score generated may be confidence-based score or combination of scores, where the relative confidence of the ID verification represents a first score and the fraud risk evaluation provides a second score. If both scores, or a combination of the scores, exceeds a minimum value, then the registration process continues at 330. However, if the analysis is not satisfied, method 300 moved to 325 where the request to register with the digital ID network is rejected as either being unable to verify the ID of the PII of the particular user or as the potential for fraud based on the analysis being too high for inclusion in the federated network.

At 330, a unique digital ID is generated for the particular user for use within the digital ID network uniquely representing the particular user to the partnership system. Additionally, a second unique digital ID specific to the customer is generated, where the second digital ID is for the customer to use in referencing the particular user during interactions between the customer and the partnership system, ensuring that should the customer be compromised, the first digital ID of the particular user used throughout the digital network would not be compromised. In some instances, the customer via which the registration occurs may be initially provided with a second, or child, digital ID associated specifically with the customer's interactions and used in interactions with the partnership system. In other instances, the child digital ID may be generated later, such as 350 below.

At 335, an image representing the unique digital ID of the particular user is generated, and the generated image is transmitted to the first entity's presentation or interface associated with the interactions with the particular user. The transmission can include instructions for the particular user to capture a photo in or submit the image via a mobile trust application associated with the digital ID network and the partnership system. In some instances, the image may be the alpha-numeric digital ID (or the native format of the digital ID without change). In other instances, the digital ID can be encoded into an image (e.g., into a QR code) and used as a replacement for the digital ID itself.

At 340, a determination of whether a photo of the generated image is received via the mobile trust application at the mobile device associated with the particular user. If no photo is received, or if the phone does not match the generated image, method 300 moves to 325, where the request is rejected. If, instead, the photo is received and corresponds to the generated image, the mobile device at which the mobile trust application is installed can be confirmed and bound to the unique digital ID of the particular user at 345, where the mobile device and the mobile trust application can be used for future ID verification and fraud detection procedures for interactions within the digital ID network involving the unique digital ID of the particular user. Further, the unique digital ID can be submitted through interfaces and applications associated with different customer systems than the first customer system, where those customer systems are registered with the digital ID network.

In addition to binding the mobile device to the unique digital ID, at 350, the partnership system can generate a first unique identifier (e.g., a GUID) for use by the first customer system when interacting related to the particular user, where the first unique identifier is different than the digital ID. The first unique identifier can be used by the first customer system to identify the particular user associated with the digital ID, thereby avoiding sharing the digital ID across system boundaries where not necessary. Each customer system with a relationship to the particular user can receive a new unique identifier that can be used in lieu of the other PII with the partnership system for future transactions.

Figure 4:
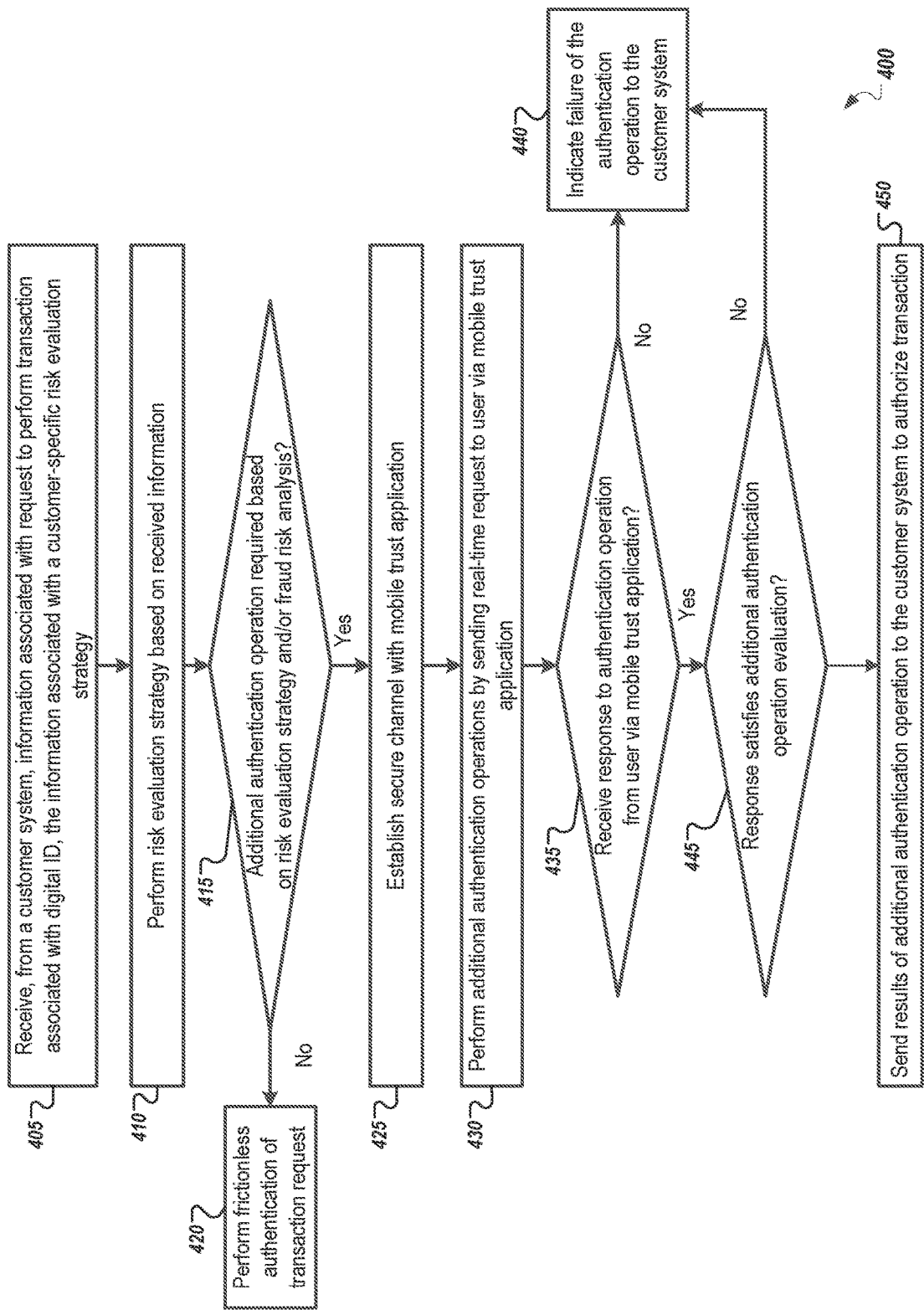
FIG. 4 is a flowchart of an example operation for performing additional authentication operations between the partnership system and a mobile trust application from the perspective of the partnership system.

FIG. 4 is a flowchart of an example operation for performing additional authentication operations between the partnership system and a mobile trust application from the perspective of the partnership system, such as partnership system 160. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, information associated with a request to perform a particular transaction associated with a digital ID is received from a customer system. The received information can include an identification of the particular user associated with the request, the type of transaction being performed, and in some instances, a customer-specific risk evaluation strategy. In other instances, customer-specific risk evaluation rules may be stored at the partnership system, and can be tied to particular types of transactions being requested. The transactions may include logins to the customer system, standard transactions (e.g., account balance reviews, account information updates, purchases under a predetermined threshold amount, etc.), relatively higher risk transactions (e.g., a transfer of funds, a request of a loan, purchases exceeding a predefined threshold, etc.), or other types of transactions. Depending on the type of transaction, particular risk evaluation strategies may be performed. Additionally, one or more fraud risk analyses may be performed based on available information associated with the particular user, the current transaction, recent transactions associated with the user, and other relevant information, including information associated with the mobile device linked and bound to the particular user's digital ID.

At 410, the risk evaluation strategy is performed based on the received information. In some instances, the risk evaluation strategy may require an additional authentication operation to be performed. In other instances, a fraud evaluation based on the received information may trigger a requirement for further authentication information prior to authorization of the requested transaction. In some instances, the risk evaluation strategy is determined implicitly from the received information, or from a connection to the transaction type identified in the received information. In some instances, the received information may be evaluated for fraud without explicit or implicit prompting, such as by comparison of the received information (and other information available about the particular user and/or the mobile device) to one or more fraud-related patterns or rules.

At 415, a determination is made as to whether additional authentication operations are required based on the performed risk evaluation strategy and/or the fraud risk analysis. If not, the process can continue at 420, where a frictionless authentication of the transaction request can be performed and passed back to the customer system associated with the transaction. If, however, an additional authentication operation is determined to be required, method 400 continues at 425, where a secure channel is established with the mobile trust application of the mobile device bound to the digital ID of the particular user.

At 430, the additional authentication operations required by the risk evaluation strategy and/or the fraud risk analysis are performed by preparing and sending real-time requests to the user via the mobile trust application. The real-time requests can include any suitable format, including a request for biometric data from the user (e.g., a fingerprint, a voice recognition process, a facial recognition process, etc.), a request for a response to a question with a known answer known by the user (e.g., the amount of a current car payment or a previous street address), a push notification requiring a second factor authentication at the mobile device, as well as other types of interactions and authentication operations.

At 435, a determination is made as to whether a response is received from the user to the requested authentication operation via the mobile trust application. In some instances, the time for a response may be limited to a certain time limit (e.g., five (5) minutes from the initial request) before the transaction is rejected. If no response is received, at 440 an indication of the failure of the authentication operation can be provided to the customer system. If a response was received, method 400 continues at 445, where a determination is made as to whether the response satisfies the additional authentication operation requirements for authorizing the transaction. If the response does not satisfy the additional authentication operation, method 400 returns to 440 and indicates to the customer system that the additional authentication operation failed. The failure to satisfy the additional authentication operation may be based on an explicit indication from the mobile trust application that the user was not associated with the original transaction request, a failed biometric response, a failed response to a knowledge-based question, or another similar failed response based on an evaluation of the response to the authentication operation. If, however, the response satisfies the evaluation of the additional authentication operation by validating the identification of the user and/or confirming that the transaction request was not fraudulent, the results of the success of the additional authentication operation can be sent to the customer system at 450, where those results may result in an authorization of the pending transaction at the customer system.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

Various potential alternatives and additional features may be considered with the illustrations and descriptions herein. In other words, although this disclosure has been described in terms of certain embodiments and generally associated methods, alterations and permutations of these embodiments and methods will be apparent to those skilled in the art.

In some instances, the trust associated with a particular device and its underlying consumer can be used to approve consumer actions in addition to customer-related actions. Whenever a customer deems a transaction to carry high risk and/or liability, the customer may wish to perform a trust elevation to mitigate the risk. Examples of this may include changes of address, money movement transactions, and others. Across the trust network and partnership, the network itself can leverage the trust to introduce trusted network members to customers (e.g., bank providers, retail providers) with the purpose of not only authenticating those members, but to provide information from the trusted user via the digital trust network to ensure that users do not need to manually enter that information again where it can possibly be intercepted. In other instances, forms used to register with the other customers may be pre-filled, or such information can be passed without requiring particular submissions via the UI by the consumer. In this aspect, as well, the use of the trust relationship can allow for non-repudiation and is considered as a factor in authenticating the user to the other customers associated with the digital trust network.

In general, the digital trust relationship of the consumer to the device, and between the consumer/device and the digital trust network, allows for a plurality of actions to be taken within the system. One capability is digital ID registration, where consumers already associated with the digital trust network can authorize, via the mobile trust application, website onboarding, mobile app onboarding, and mobile hub-app onboarding based on the trusted device relationship. Further, added security can be provided to customer systems that allows those customers to provide consumers with frictionless access and logins to websites, mobile apps, and mobile hub-apps, where appropriate, and where the mobile trust application is used or associated with the interactions, thus providing the information needed to confirm the trust relationship.

Still further, the trust relationship can allow particular customers to leverage the digital trust network's and the mobile trust application's capabilities by mitigating risk on high-risk transactions as defined by the customer. Specifically, step-up approval and/or context-based authentication can be used to require additional manual or interactive confirmation, determinations, and/or authentications for transactions and operations that may include additional risk. For example, payment approvals made via websites, mobile apps, and/or other channels may be associated with additional security interactions or requests, which can be sent or delivered via the mobile trust application, as the user/consumer is trusted to be associated with the mobile device and can authenticate or authorize the transactions via messages or interactions performed via the mobile trust application.

In other instances, the consumer may be able to perform device management operations via the mobile trust application, as well as interact with customer support functionality and capabilities. Via the mobile trust application, consumers may be able to perform customer support activities for device management, including de-registering the device, suspend the device, or look-up digital IDs associated with the partnership system. Additionally, UIs and interactions may be made available for the consumer to research transactions performed across the digital trust network on demand, allowing the consumer to determine and confirm that activity performed using the trusted digital identity conforms to the known activities of the user.

Accordingly, the above description of example embodiments does not define or constrain this disclosure. Other changes, substitutions, and alterations are also possible without departing from the spirit and scope of this disclosure.

What is claimed is:

1. A partnership system comprising:
   at least one processor; and
   a non-transitory computer-readable medium storing instructions executable by the at least one processor, the instructions instructing the at least one processor to:
   generate a first unique digital ID for a user for use within a digital ID network in response to a request to register a mobile device of the user, wherein the first unique digital ID uniquely represents the user to the partnership system;
   transmit a generated image representing the first unique digital ID to an interface of a first customer system associated with interactions with the user, wherein the first customer system is registered within the digital ID network, wherein the transmitted image includes instructions for the user to capture a photo in or to submit the image to verify an identity of the user via a mobile trust application installed on a mobile device associated with the user, and wherein the mobile trust application is associated with the digital ID network and the partnership system; and in response to verifying the identity of the user via the mobile trust application installed at the mobile device by verifying that the photo or the image corresponds to the first unique digital ID of the user, bind the mobile device of the user to the first unique digital ID of the user within the digital ID network by incorporating device information of the mobile device into the first unique digital ID so that the generated first unique digital ID is available to be used by the first customer system for authentication of the user.

2. The system of claim 1, wherein the mobile device is associated with a unique set of device information, and wherein the unique set of device information is incorporated into the generated first unique digital ID associated with the user.

3. The system of claim 1, wherein the generated first unique digital ID is available to be used by a plurality of customer systems registered within the digital ID network for authentication the user.

4. The system of claim 1, wherein the user is associated with a first trust relationship with the first customer system, and wherein the first trust relationship between the first customer system and the user is based on a predefined registration and authentication of the user by the first customer system.

5. The system of claim 1, wherein the first customer system is associated with a set of customer-specific authentication rules, wherein each set of customer-specific authentication rules identify (1) a set of transactions for the first customer system and (2) a level of authentication required by users associated with those transactions.

6. The system of claim 5, wherein at least some of the transactions for the first customer system require at least one first additional authentication operation for users associated with those transactions, wherein the at least one first additional authentication operation comprises a first authentication request to be transmitted from the partnership system to the mobile device of the user previously bound with the first unique digital ID associated with the transaction, the partnership system further configured to transmit the first authentication request to the mobile trust application installed on the mobile device, wherein the first authentication request is presented via the mobile trust application.

7. The system of claim 6, wherein the first additional authentication request comprises a request for biometric input from the user associated with the first unique digital ID via the mobile trust application.

8. The system of claim 6, wherein the first additional authentication request comprises a request for a response via user input to an authentication challenge.

9. The system of claim 6, wherein the instructions instruct the at least one processor to:
receive a response to the transmitted first authentication request from the mobile trust application installed on the mobile device;
validating the received response;
in response to successful validating of the received response to the first authentication request, authorizing the transaction; and
in response to unsuccessfully validating of the received response to the first authentication request, denying authorization of the transaction.

10. The system of claim 6, wherein a fraud detection evaluation is performed on each requested transaction associated with the first unique digital ID.

11. The system of claim 10, wherein, in response to a potential fraud detection based on the fraud detection evaluation, performing at least one second additional authentication request, wherein the at least one second additional authentication request comprises a second authentication request to be transmitted from the partnership system to a mobile device previously bound with the digital ID associated with the transaction, the system further configured to transmit the second authentication request to a mobile trust application installed on the mobile device, wherein the second authentication request is presented via the mobile trust application.

12. The system of claim 1, wherein the instructions instruct the at least one processor to:
generate a second unique digital ID for use by the first customer system to reference the user during interactions between the first customer system and the partnership system, wherein the second unique digital ID is different than the first unique digital ID.

13. The partnership system of claim 1, wherein the generated first unique digital ID that represents the user incorporates device information for another bound mobile device prior binding of the mobile device of the user to the first unique digital ID in response to verifying the identity of the user via the mobile trust application.

14. A non-transitory, computer-readable medium storing computer-readable instructions executable by a computer, the instructions, when executed, configured to:
generate a first unique digital ID for a user for use within a digital ID network in response to a request to register a mobile device of the user, wherein the first unique digital ID uniquely represents the user to a partnership system;
transmit a generated image representing the first unique digital ID to an interface of a first customer system associated with interactions with the user, wherein the first customer system is registered within the digital ID network, wherein the transmitted image includes instructions for the user to capture a photo in or to submit the image to verify an identity of the user via a mobile trust application installed on a mobile device associated with the user, and wherein the mobile trust application is associated with the digital ID network and the partnership system; and
in response to verifying the identity of the user via the mobile trust application installed at the mobile device by verifying that the photo or the image corresponds to the first unique digital ID of the user, bind the mobile device of the user to the first unique digital ID of the user within the digital ID network by incorporating device information of the mobile device into the first unique digital ID so that the generated first unique digital ID is available to be used by the first customer system for authentication of the user.

15. The computer-readable medium of claim 14, wherein the mobile device is associated with a unique set of device information, and wherein the unique set of device information is incorporated into the generated first unique digital ID associated with the user.

16. The computer-readable medium of claim 14, wherein the generated first unique digital ID is available to be used by a plurality of customer systems registered within the digital ID network for authentication the user.

17. The computer-readable medium of claim 14, the instructions, when executed, configured to:

generate a second unique digital ID for use by the first customer system to reference the user during interactions between the first customer system and the partnership system, wherein the second unique digital ID is different than the first unique digital ID.

18. A computerized method performed by one or more processors, the method comprising:

generating a first unique digital ID for a user for use within a digital ID network in response to a request to register a mobile device of the user, wherein the first unique digital ID uniquely represents the user to a partnership system;

transmitting a generated image representing the first unique digital ID to an interface of a first customer system associated with interactions with the user, wherein the first customer system is registered within the digital ID network, wherein the transmitted image includes instructions for the user to capture a photo in or to submit the image to verify an identity of the user via a mobile trust application installed on a mobile device associated with the user, and wherein the mobile trust application is associated with the digital ID network and the partnership system; and in response to verifying the identity of the user via the mobile trust application installed at the mobile device by verifying that the photo or the image corresponds to the first unique digital ID of the user, binding the mobile device of the user to the first unique digital ID of the user within the digital ID network by incorporating device information of the mobile device into the first unique digital ID so that the generated first unique digital ID is available to be used by the first customer system for authentication of the user.

19. The method of claim 18, wherein the mobile device is associated with a unique set of device information, and wherein the unique set of device information is incorporated into the generated first unique digital ID associated with the user.

20. The method of claim 18, wherein the generated first unique digital ID is available to be used by a plurality of customer systems registered within the digital ID network for authentication of the user.

21. The method of claim 18, comprising:

generating a second unique digital ID for use by the first customer system to reference the user during interactions between the first customer system and the partnership system, wherein the second unique digital ID is different than the first unique digital ID.

* * * * *